US008141005B2

(12) United States Patent
Oh

(10) Patent No.: US 8,141,005 B2
(45) Date of Patent: Mar. 20, 2012

(54) APPARATUS FOR OPC AUTOMATION AND METHOD FOR FABRICATING SEMICONDUCTOR DEVICE USING THE SAME

(75) Inventor: See Young Oh, Seoul (KR)

(73) Assignee: Hynix Semiconductor Inc., Icheon-si (KR)

( * ) Notice: Subject to any disclaimer, the term of this patent is extended or adjusted under 35 U.S.C. 154(b) by 638 days.

(21) Appl. No.: 12/260,178

(22) Filed: Oct. 29, 2008

(65) Prior Publication Data

US 2009/0113376 A1 Apr. 30, 2009

(30) Foreign Application Priority Data

Oct. 31, 2007 (KR) ........................ 10-2007-0110679

(51) Int. Cl.
*G06F 17/50* (2006.01)
*G06F 15/16* (2006.01)
(52) U.S. Cl. ............ 716/53; 709/201; 709/202; 709/203
(58) Field of Classification Search .............. 716/50–55; 709/201–203

See application file for complete search history.

(56) References Cited

U.S. PATENT DOCUMENTS

| 6,163,794 | A * | 12/2000 | Lange et al. ............... 709/202 |
| 6,745,382 | B1 * | 6/2004 | Zothner ..................... 717/107 |
| 7,020,697 | B1 * | 3/2006 | Goodman et al. ........... 709/223 |
| 7,298,973 | B2 * | 11/2007 | Ovadia et al. .............. 398/49 |
| 2002/0198992 | A1 * | 12/2002 | Stutz et al. ................ 709/225 |
| 2003/0041095 | A1 * | 2/2003 | Konda et al. .............. 709/201 |
| 2003/0126581 | A1 * | 7/2003 | Pang et al. ................ 716/19 |
| 2004/0181769 | A1 * | 9/2004 | Kochpatcharin et al. .... 716/19 |
| 2005/0091305 | A1 * | 4/2005 | Lange et al. ............... 709/202 |
| 2005/0132306 | A1 * | 6/2005 | Smith et al. ............... 716/1 |
| 2005/0246049 | A1 * | 11/2005 | Suttile et al. .............. 700/117 |
| 2005/0256669 | A1 * | 11/2005 | Mitsui ...................... 702/123 |
| 2006/0026549 | A1 * | 2/2006 | Tsao et al. ................. 716/19 |
| 2006/0031809 | A1 * | 2/2006 | Zach ........................ 716/19 |
| 2006/0123381 | A1 * | 6/2006 | Nakamura et al. .......... 716/21 |
| 2006/0129967 | A1 | 6/2006 | Tanaka et al. .............. 716/19 |
| 2006/0214119 | A1 * | 9/2006 | Katase et al. .............. 250/492.22 |
| 2007/0277145 | A1 * | 11/2007 | Scaman ..................... 716/19 |

(Continued)

FOREIGN PATENT DOCUMENTS

JP 2000-260879 9/2000

*Primary Examiner* — Stacy Whitmore
(74) *Attorney, Agent, or Firm* — Marshall, Gerstein & Borun LLP

(57) ABSTRACT

An OPC automation apparatus and manufacturing method of a semiconductor device using the same, being capable of improving the fabrication yield of a semiconductor device by establishing a system and an OPC automation apparatus in which an engineer computer and a work station are connected to one database such that all OPC tasks are monitored in the engineer computer and the OPC task is automatically performed. An OPC automation apparatus may include a first computer that receives a first OPC information from outside to store; and a second computer that receives the first OPC information from the first computer to perform an OPC process, generates a second OPC information from the result of the performance of an OPC process, and delivers the second OPC information to the first computer, wherein the second computer delivers the second OPC information to the first computer such that the first computer is able to compare and analyze the first OPC information with the second OPC information.

10 Claims, 3 Drawing Sheets

U.S. PATENT DOCUMENTS

| | | | | |
|---|---|---|---|---|
| 2008/0022255 A1* | 1/2008 | Zach | | 716/19 |
| 2008/0077891 A1* | 3/2008 | Dooling et al. | | 716/4 |
| 2008/0086715 A1* | 4/2008 | Zach | | 716/19 |
| 2008/0174756 A1* | 7/2008 | Granik | | 355/67 |
| 2008/0263501 A1* | 10/2008 | Chen et al. | | 716/19 |
| 2009/0031261 A1* | 1/2009 | Smith et al. | | 716/2 |

* cited by examiner

APPARATUS FOR OPC AUTOMATION AND METHOD FOR FABRICATING SEMICONDUCTOR DEVICE USING THE SAME

CROSS-REFERENCES TO RELATED APPLICATIONS

The present application claims priority to Korean patent application number 10-2007-110679, filed on 31 Oct. 2007, which is incorporated by reference in its entirety.

BACKGROUND OF THE INVENTION

In the conventional optical proximity correction (OPC) method, after an engineer directly collects data necessary for an OPC task from a workstation, data format for the OPC task is calculated in an engineering computer. It is then inputted again to the work station. But, in this case, there is a danger that the OPC process is subject to the subjective determination of the engineer, and the possibility that the fabrication yield of a semiconductor device is significantly reduced, since a determined format by each process cannot be confirmed. The present invention relates to an OPC automation apparatus and manufacturing method of a semiconductor device using the same.

A computer simulation tool is used for engineers in the integrated circuit (IC) design of the semiconductor device in order to create a design diagram. At this time, in order to accurately implement a very large scale integration within a semiconductor substrate, a physical display or a layout of the designed circuit itself before moving on to silicone is required. Moreover, a computer aided design (CAD) tool supports the task so that designers might convert individual circuit components into forms which will be implemented within the integrated circuit.

Semiconductor devices have individual circuit components such as a gate, an element isolation film, an impurity diffusion regions, a capacitor, a bit line, metal wirings and contact plugs that interconnect those components. In order to produce a functional circuit, such semiconductor devices are designed by software programs like the CAD system according to a predetermined design rule of one set. At this time, a design rule that performs a specific processing and determines a design limit is determined. For example, in order not to affect each other with any undesirable method between semiconductor devices, the design rule defines an allowed space value between the semiconductor devices or the lines that interconnect devices. The design rule limit is often called a critical dimension (CD). Generally, the critical dimension of a specific circuit is defined with a minimum line width or with a minimum space between two lines. Consequently, the critical dimension determines the whole size of the semiconductor chip and the density of the integrated circuit.

If the integrated circuit is designed with this method, the step of implementing the design on the semiconductor substrate progresses to the fabrication process of the integrated circuit. Optical lithography used in this step is a widely known process in which geometric shapes are implemented on the surface of the silicon wafer. Generally, the optical lithography process is initiated with forming the photoresist layer on the upper surface of the semiconductor wafer. Then, pure light non-transparent opaque regions formed with a chrome pattern and pure optical transmission opening regions formed with a quartz substrate are disposed on the upper portion of the wafer, which is coated with a photoresist layer.

A light is irradiated on a mask from a visible light source or a UV light source, and the light passing through optical lenses including one or several lenses, filters and mirrors passes through the opening areas of the mask. The photoresist layer is exposed by the light including a mask image which is reduced after passing through the mask.

The exposed region or the non-exposed region of the photoresist layer is developed through chemical removal, if necessary. As a result, the photoresist pattern defines geometry structures, features, lines and the shapes of the layer on the upper portion of the semiconductor wafer. Then, the region of the lower portion of the wafer is etched with a photoresist pattern to form the semiconductor device.

However, as the critical dimensions of the integrated circuit become smaller and approach a limit resolution value of the lithography equipment, the consistency between the actually formed photoresist pattern and the design mask is significantly reduced. Particularly, it was observed that the pattern variation of the circuit regions depends on the proximity of the region for each other.

Therefore, in order to reproduce accurately a desirable image on the wafer after the photolithography, integrated circuits having a restricted complexity which is almost identical demand correction of the initial mask design in the optical proximity effect. The proximity effect is produced when the pattern regions in which a gap is maintained to be near are lithographed and transferred to a resistant layer on the wafer. The light-waves which pass through the region in which a gap is maintained to be near affect each other, and in the end, distorting pattern regions are finally transferred.

Another problem which occurs when the sizes and gap of region approaches to the resolution limit of a lithography tool has the tendency that corners (a concave part and a convex part) are overly exposed or insufficiently exposed due to the concentration or the shortage of the energy at each corner. Likewise, when big and small regions are transferred from the same mask pattern, other problems of the excessive exposure or the insufficient exposure of small regions occur.

Presently, there are many methods for overcoming the problem of the proximity effect. These methods include precompensating of mask line widths, change of the thickness of the photoresist layer, usage of photoregist processes of the multi layer, usage of the electron beam imaging with the optical imaging and, finally, adding additional regions to an initial mask pattern in order to compensate for the proximity effect. Among these methods, the final method is known as "optical proximity correction (OPC)".

The additional regions that are added to the initial mask when the OPC is used are typically a low level resolution (that is, the dimension is below the resolution of an exposure tool). Accordingly, they are not transferred to the resistant layer. Instead, in order to improve the pattern transferred and compensate for the proximity effect, these interact with the initial pattern.

Presently, several publicly known OPMSs (OPC Procedure Management System) are useful for regulating the resolution of the mask in order to include OPC regions. However, the products available in these days have many restrictions in the point of view of accuracy, speed, amount of data and verification of the resultant OPC correction mask design. For example, when the OPC regions are added to the mask, the current products utilize a passively inputted result. Therefore, an exact hierarchical data format of the initial mask design cannot be maintained.

The OPC task is usually performed in the workstation. At this time, the engineer directly collects necessary data for the OPC task, and calculates data format for the OPC task in the engineer computer, and inputs it again to the workstation. But in this case, the process is subjective and there exists the possibility that the processing yield of the semiconductor device remarkably decreases as the format determined by each class cannot be confirmed.

BRIEF SUMMARY OF THE INVENTION

Embodiments of the present invention are directed to provide an OPC automation apparatus and manufacturing method using the same, which is capable of improving the fabrication yield of a semiconductor device by objectively confirming data for the OPC task, and by connecting a work station and an engineer computer to one database so that data for the OPC task is automatically connected on a real time basis.

According to an embodiment of the present invention, an OPC automation apparatus may include a first computer that receives a first OPC information from outside to store; and a second computer that receives the first OPC information from the first computer to perform an OPC process, generates a second OPC information from the result of the performance of the OPC process, and delivers the second OPC information to the first computer, wherein the second computer delivers the second OPC information to the first computer such that the first computer is able to compare and analyze the first OPC information with the second OPC information. In accordance with an embodiment of the present invention, the first computer may include a web server that receives the first OPC information from outside; an application server that classifies the received first OPC information; and an OPMS server that communicates the classified first OPC information with the second computer. The web server includes a GUI (Graphic User Interface) that automatically connects the first computer and the second computer to a monitor. The second computer includes an OPC agent that interprets the first OPC information received from the first computer as a command for the OPC process; a wrapper that performs the OPC process according to the command; and an event trigger that transmits the OPC process performing result. The OPC agent, so as to automatically perform the OPC process in the second computer, converts the first OPC information to a reference information of a variable and a parameter used in the OPC process.

According to another embodiment of the present invention, an OPC method includes receiving a first OPC information from an external terminal to generate; storing the first OPC information in a storage; performing an OPC process according to the first OPC information, and generating a second OPC information from the result of the performance of an OPC process; and storing the second OPC information in the external terminal. The first and the second OPC information include an information on a mask manufacture. The first and the second OPC information include an information on a semiconductor device, a layer, and a database. The performing an OPC process may include automatically converting the OPC information to a definition for a content and outcome for working in a computer (S320); converting the definition for the content and outcome to a rule for a plan, a route, a process, a recipe, and a target (S330); and transmitting the rule to the external terminal (S340). The rule for the route of the plan may include a rule for an isolation, a gate, a bit line or a metal. The rule for the process of the route includes a rule for the process of AOPC, MBV, ORC, or a layout check. The rule for the process of the recipe and the target may include a rule for a workstation, a directory, a job file or a specification.

According to still another embodiment of the present invention, a method of manufacturing a mask may include providing a mask substrate; and performing an OPC in the mask substrate according to the OPC method of claim 6 to manufacture a mask.

According to still another embodiment of the present invention, a method of manufacturing a semiconductor device may include providing a mask manufactured by the above method; providing a semiconductor substrate in which an underlying layer is formed; and forming an underlying layer pattern by performing a lithographic process in the underlying layer by using the mask.

DESCRIPTION OF EMBODIMENTS

Embodiments of the present invention will be described in detail with reference to the attached drawings.

According to a route file which is put into in a plan, engineers input an OPC process management using an OPMS. At this time, since the OPMS (OPC Procedure Management System) process management is performed with manually monitoring the OPC progress method, the progress situation, and the information of outcome, the process time is much required and the probability of error generation is high.

Therefore, embodiments of the present invention establish an inline OPMS (inline OPC Procedure Management System: iOPMS) in which the OPC progress method, the progress situation, and the information of outcome are monitored in an engineer computer of each engineer and an input information according to each situation is automatically set up and operated such that the process time is improved and the error generation rate is reduced.

Figure 1:
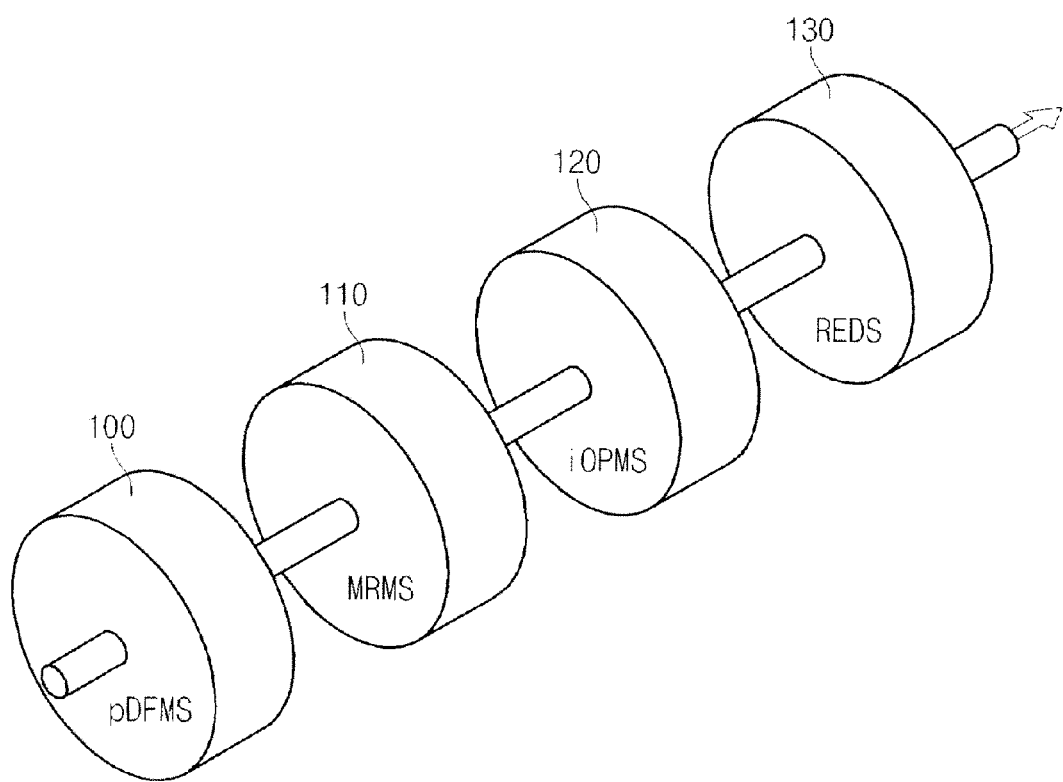
FIG. 1 is a schematic diagram showing a mask manufacture system according to an embodiment of the present invention.

FIG. 1 is a schematic diagram showing a mask manufacture system according to an embodiment of the present invention. Referring to FIG. 1, a pattern to be formed in a mask is designed by using a pDFMS 100 (patterning DFm (Design for manufacturing) Management System), while the design pattern is corrected by using the MRMS 110 (Mask Revision Management System). Then, the OPC is applied to the mask pattern by using the iOPMS 120 (inline OPC Procedure Management System). Thereafter, the mask is completed by using a REDS 130 (Reticle Engineering & Development System). At this time, the iOPMS 120 automatically receives the information of the MRMS 110 and is able to smoothly perform the OPC application task without depending on the REDS 130 through an independent database re-engineering and application.

Figure 2:
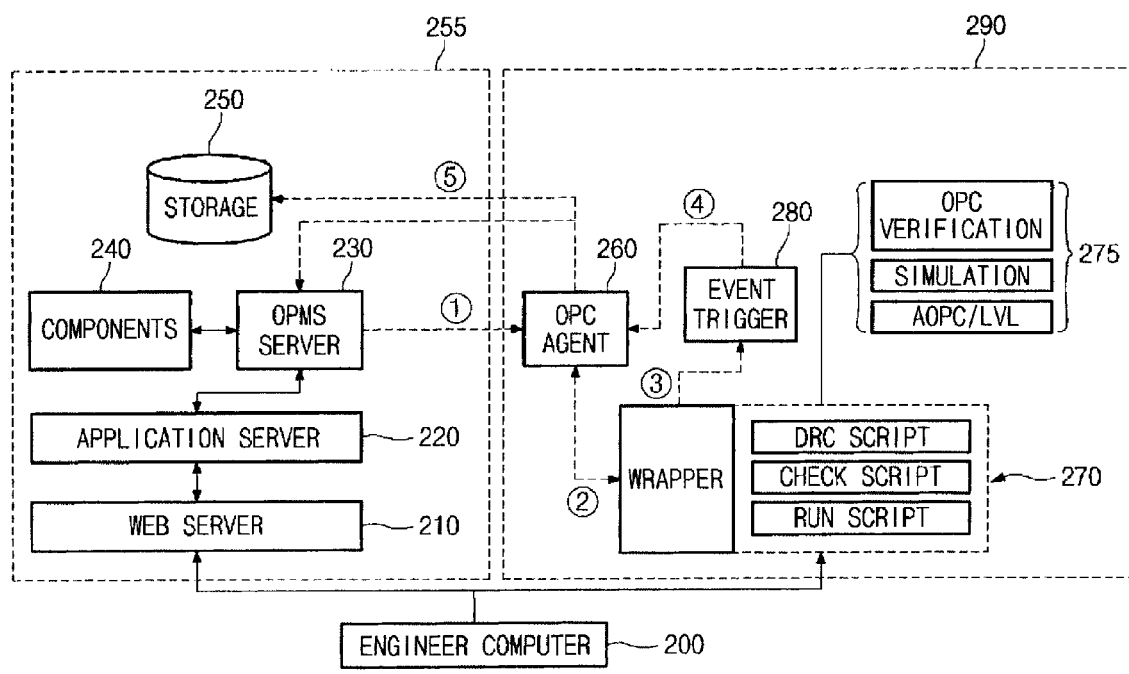
FIG. 2 is a schematic diagram showing an OPC automation apparatus according to an embodiment of the present invention.

FIG. 2 is a schematic diagram showing an OPC automation apparatus according to an embodiment of the present invention. Referring to FIG. 2, while a user directly inputs an OPC processing information, an engineer computer 200 having an interface that is able to verify the processing result according to an input is equipped.

In addition, the OPC automation apparatus of the invention includes a database server group 255, e.g., 'first computer' and a work station 290, e.g., a 'second computer'. And, the database server group 255 receives the first OPC information from the outside (engineer computer 200) to store while delivering it to the work station 290. The work station 290 performs the OPC process based on the OPC information received from the database server group 255, and producing a second OPC information from the result of the performed OPC process and delivering again to the database server group 255. Thereafter, the database server group 255 may compare the first OPC information with the second OPC information to analyze, or may renew the first OPC information with the second OPC information.

The OPC processing information inputted to the engineer computer 200 is inputted to the database server group 255 in the OPC automation apparatus. This database server group 255 includes a web server 210 which primarily receives the OPC processing information which is inputted from the engineer computer 200, an application server 220 which classifies the inputted OPC processing information, and an OPMS server 230 which can communicate the classified OPC processing information with the workstation 290 of the OPC automation apparatus. Further, it includes components 240 that physically connect the OPMS server 230 with a database storage 250.

In this way, the OPC processing information inputted to the engineer computer 200 is delivered to the application server 220 from the web server 210, and delivered again to the OPMS server 230 from the application server 220. The OPC processing information is copied into two parts and one part is stored in the database storage 250 through components 240. The other part is transmitted to the work station 290. Here, the web server 210 may further include a GUI (Graphic User Interface) that automatically connects the engineer computer 200 and the work station 290 to monitor.

Then, the OPC processing information is transmitted from the OPMS server 230 to the work station 290. At this time, the work station 290 includes an OPC agent 260 that interprets the OPC processing information received from the database server group 255 as a command for the OPC process, a wrapper 270 which performs the OPC process according to the command, and an event trigger 280 which transmits the OPC process performing result.

Here, in order to automatically perform the OPC process in the workstation, the OPC agent 260 converts the OPC processing information into a variable and a parameter for a task. Further, it performs an inverse transform so as to deliver the outcome received from the event trigger 280 to the database 255. The wrapper 270 includes a DRC script, a Check script or an Etc. Run script, while being connected to a sub wrapper 275 that performs an OPC verification, a simulation or an AOPC/LVL function by using such script information.

Figure 3:
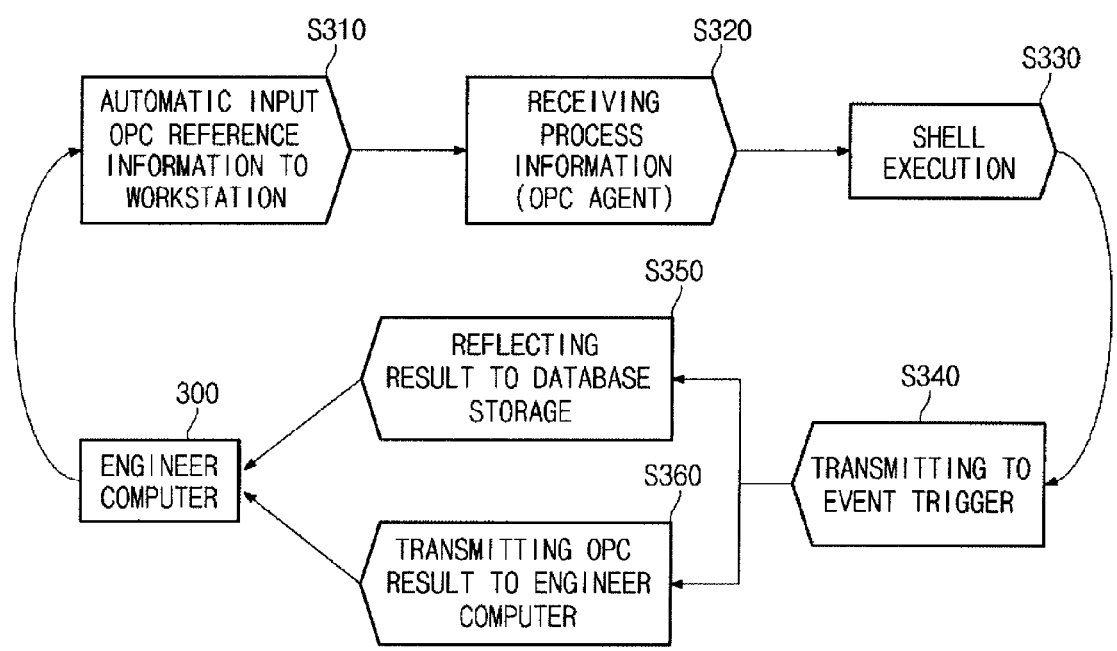
FIG. 3 is flowchart showing a manufacturing method of a semiconductor device according to an embodiment of the present invention.

FIG. 3 is flowchart showing a manufacturing method of a semiconductor device according to an embodiment of the present invention. Referring to FIG. 3, firstly, a step S300 of inputting an OPC reference information to the engineer computer 200 is performed. At this time, the inputted OPC reference information includes information on a mask manufacturing, and includes information on a semiconductor device, a layer, and a database server group. These OPC reference information can be simply inputted without being adjusted to the User Interface displayed on the engineer computer.

Then, a step S310 of automatically inputting the OPC reference information to the work station 290 through the database server group 255 is performed. The OPC reference information is transmitted to the OPC agent 260 of the work station 290 after passing through the web server 210 and the OPMS server 230.

Thereafter, the step S320 of automatically converting the OPC reference information to the definition for a content for working in the work station 290 and the outcome is performed. That is, a variable and a parameter for performing a command by process type is generated.

Then, a step S330 of executing a shell is performed. The shell execution step means that the OPC reference information that the engineer inputs after the log-in is converted into a machine language and delivered to a kernel of the work station 290 and each command is translated and the OPC process is performed.

In detail, the step of automatically converting the definition for the content and outcome generated at the step S320 to the rules for the plan, the route, the process, the recipe, and the target in the wrapper of the work station.

Here, the rule for the route of the plan includes the rule for an isolation, a gate, and a bit line (BIT-LINE) or a metal. The rule for the process of the route includes the process rule for AOPC (Auto OPC), MBV (Model Based Verification), ORC (Optical Rule Check) or a layout check. The rule for the recipe and target of the process includes the rule for a work station, a directory, a job file or a specification.

Thereafter, a step S340 of transmitting the shell execution result to the event trigger 280 is performed. The event trigger 280 delivers the rule for the workstation, the directory, the job file or the specification to the OPC agent. The OPC agent 260 of the work station 290 transforms the OPC result into a form which is readable for the engineer, and such result is transmitted to the OPMS server 230 of the database server group 255.

Then, a step S350 of reflecting the result to the database storage 250 of the database server group 255 in the OPMS server 230, and a step S360 of transmitting the OPC result to the engineer computer are performed. In this way, the OPC result, which was automatically performed can be monitored on a real time basis in the engineer computer through the GUI (Graphic User Interface) included in the web server 210 of the database server group 255.

As described above, when a semiconductor manufacturing method like a mask production is performed, in case of performing the OPC process, typically, a manual method that an engineer collects data necessary for an OPC task and calculates data format for the OPC task in the engineer computer and inputs it again to the work station was used. However, in this case, there is a danger that the process is wrongly performed and subjectively determined, and also there is a possibility that the formation processing yield of a semiconductor device decreases as the format determined by each class cannot be confirmed.

Accordingly, in accordance with embodiments of the invention an apparatus connects a workstation and an engineer computer to one database server group so that data for the OPC task can be objectively confirmed, and the OPC process can be automatically performed. Here, the database server group includes a web server, an application server and an OPMS server. The GUI (Graphic User Interface) which facilitates an OPC process information input and a monitoring are equipped in the web server, such that data for the OPC task is more readily automatically connected on a real time basis.

As illustrated above, an OPC automation apparatus and a manufacturing method of a semiconductor device using it establishes an auto-connection system in an engineer computer and a work station that performs an OPC task such that an OPC process is performed under objective standards. Accordingly, subjective standards or human mistake can be prevented. In addition, it is possible to facilitate a mass production OPC progressing, to implement a standardization according to the recipe unification, and to contribute to the reduction of OPC working hours and the enhancement of OPC accuracy. Accordingly, the invention provides an effect of improving a fabrication yield and a reliability of a semiconductor device.

The above embodiments of the present invention are illustrative and not limitative. Various alternatives and equivalents are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. An OPC automation apparatus, comprising:
a first computer that receives a first OPC information from an external terminal and stores the first OPC information; and
a second computer that receives the first OPC information from the first computer to perform an OPC process, generates a second OPC information from the result of the performance of an OPC process, and delivers the second OPC information to the first computer,
wherein the second computer comprises:
an OPC agent that interprets the first OPC information received from the first computer as a command for the OPC process;
a wrapper that performs the OPC process according to the command; and
an event trigger that transmits the OPC process performing result,
wherein the OPC agent, so as to automatically perform the OPC process in the second computer, converts the first OPC information to a reference information of a variable and a parameter used in the OPC process.

2. The OPC automation apparatus of claim 1, wherein the first computer comprises:
a web server that receives the first OPC information from the external terminal;
an application server that classifies the received first OPC information; and
an OPMS server that communicates the classified first OPC information with the second computer.

3. The OPC automation apparatus of claim 2, the web server comprises a GUI (Graphic User Interface) that automatically connects the first computer and the second computer and monitors the first computer and the second computer.

4. An OPC method, comprising:
receiving a first OPC information from an external terminal;
storing the first OPC information in a storage;
performing an OPC process according to the first OPC information, and generating a second OPC information from the result of the performance of an OPC process; and
storing the second OPC information in the external terminal
wherein performing an OPC process comprises:
automatically converting the OPC information to a definition for a content and outcome for working in a computer, so that a variable and a parameter for performing a command by process type is generated;
converting the definition for the content and outcome to a rule for a plan, a route, a process, a recipe, and a target so that the first OPC information is converted into a machine language; and
transmitting the rule to the external terminal.

5. The OPC method of claim 4, wherein the first and the second OPC information include an information on a mask manufacture.

6. The OPC method of claim 4, wherein the first and the second OPC information include an information on a semiconductor device, a layer, and a database.

7. The OPC method of claim 4, wherein the rule for the route of the plan includes a rule for an isolation, a gate, a bit line or a metal.

8. The OPC method of claim 4, wherein the rule for the process of the route includes a rule for the process of AOPC, MBV, ORC, or a layout check.

9. The OPC method of claim 4, wherein the rule for the process of the recipe and the target includes a rule for a workstation, a directory, a job file or a specification.

10. A method of manufacturing a semiconductor device, comprising:
providing a mask substrate; and
performing an OPC in the mask substrate;
providing a semiconductor substrate in which an underlying layer is formed; and
forming an underlying layer pattern by performing a lithographic process in the underlying layer by using the mask to provide a semiconductor device,
wherein the OPC method includes:
receiving a first OPC information from an external terminal;
storing the first OPC information in a storage;
performing an OPC process according to the first OPC information, and generating a second OPC information from the result of the performance of an OPC process;
storing the second OPC information in the external terminal,
wherein performing an OPC process comprises:
automatically converting the OPC information to a definition for a content and outcome for working in a computer, so that a variable and a parameter for performing a command by process type is generated;
converting the definition for the content and outcome to a rule for a plan, a route, a process, a recipe, and a target so that the first OPC information is converted into a machine language; and
transmitting the rule to the external terminal.

* * * * *

UNITED STATES PATENT AND TRADEMARK OFFICE
CERTIFICATE OF CORRECTION

PATENT NO. : 8,141,005 B2  Page 1 of 1
APPLICATION NO. : 12/260178
DATED : March 20, 2012
INVENTOR(S) : Oh It is certified that error appears in the above-identified patent and that said Letters Patent is hereby corrected as shown below:

On the Title Page, in Item [75], delete "See Young Oh," and insert -- Se Young Oh, --, therefor.

Signed and Sealed this
Twelfth Day of August, 2014

Michelle K. Lee
*Deputy Director of the United States Patent and Trademark Office*